US012506775B2

United States Patent
Anderson et al.

(10) Patent No.: US 12,506,775 B2
(45) Date of Patent: Dec. 23, 2025

(54) MALWARE PROCESS INJECTION DETECTION

(71) Applicant: Cisco Technology, Inc., San Jose, CA (US)

(72) Inventors: Blake Harrell Anderson, Chapel Hill, NC (US); Andrew Chi, Chapel Hill, NC (US); David Arthur Mcgrew, Poolesville, MD (US); Joseph Dave Rosen, Cary, NC (US); Adam Burke Weller, Clarksville, MD (US)

(73) Assignee: Cisco Technology, Inc., San Jose, CA (US)

( * ) Notice: Subject to any disclaimer, the term of this patent is extended or adjusted under 35 U.S.C. 154(b) by 139 days.

(21) Appl. No.: 18/438,249

(22) Filed: Feb. 9, 2024

(65) Prior Publication Data

US 2025/0260719 A1    Aug. 14, 2025

(51) Int. Cl.
*H04L 9/40*    (2022.01)
(52) U.S. Cl.
CPC ................ *H04L 63/1466* (2013.01)
(58) Field of Classification Search
CPC .................................. H04L 63/1466
See application file for complete search history.

(56) References Cited

U.S. PATENT DOCUMENTS

| 7,797,702 | B1* | 9/2010 | Ferrie | G06F 21/52 |
| | | | | 713/188 |
| 9,413,782 | B1* | 8/2016 | Adams | H04L 63/145 |
| 2005/0108562 | A1* | 5/2005 | Khazan | G06F 11/3604 |
| | | | | 726/23 |
| 2019/0036963 | A1 | 1/2019 | Ahad et al. | |
| 2021/0273953 | A1* | 9/2021 | Fellows | G06F 21/554 |
| 2022/0294817 | A1 | 9/2022 | Parekh et al. | |
| 2023/0275916 | A1 | 8/2023 | Moshitzky et al. | |
| 2023/0319108 | A1 | 10/2023 | Gechman et al. | |
| 2023/0336574 | A1 | 10/2023 | Rozenbaum et al. | |
| 2025/0233885 | A1* | 7/2025 | Raj | H04L 63/145 |

* cited by examiner

*Primary Examiner* — Vance M Little
(74) *Attorney, Agent, or Firm* — Lee & Hayes, P.C.

(57) ABSTRACT

Techniques for detecting malware process injection on a host device. The techniques may include receiving endpoint metadata associated with an event, the endpoint metadata including information associated with a process that made a network connection from a host device. The techniques may also include receiving network metadata associated with the event, the network metadata including a network protocol fingerprint used to make the network connection. The techniques may further include determining that the network protocol fingerprint is indicative of a presence of malware process injection via the process running on the host device. Based on detecting the process of the malware process injection, an indication may be reported to a monitoring system and one or more remedial actions may be taken.

20 Claims, 8 Drawing Sheets

MALWARE PROCESS INJECTION DETECTION

TECHNICAL FIELD

The present disclosure relates generally to techniques for, among other things, detecting a presence of malware that has been injected into processes running on a host device.

BACKGROUND

Malware process injection is a sophisticated technique employed by malicious software to compromise the integrity and security of a computer system. This method involves the injection of malicious code or payloads into the address space of a legitimate process, allowing the malware to execute within the context of a trusted application. The process injection technique enables malware to evade detection and bypass security measures, as it operates within the guise of a legitimate process, making it more challenging for traditional antivirus and security tools to identify and mitigate the threat.

In an Extended Detection and Response (XDR) setting, detection engines have access to multiple views of an endpoint's activity and are capable of correlating a process that initiated a network connection with metadata associated with that network connection. However, similar to the impact of dataset poisoning (e.g., deliberate and malicious contamination of data to compromise machine-learning (ML) models and artificial intelligence (AI) solutions), the impact of process injection on endpoint ground truth labels can mislead machine-learned models and other AI-based solutions, making the detection of process injection exceedingly difficult for XDR systems.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
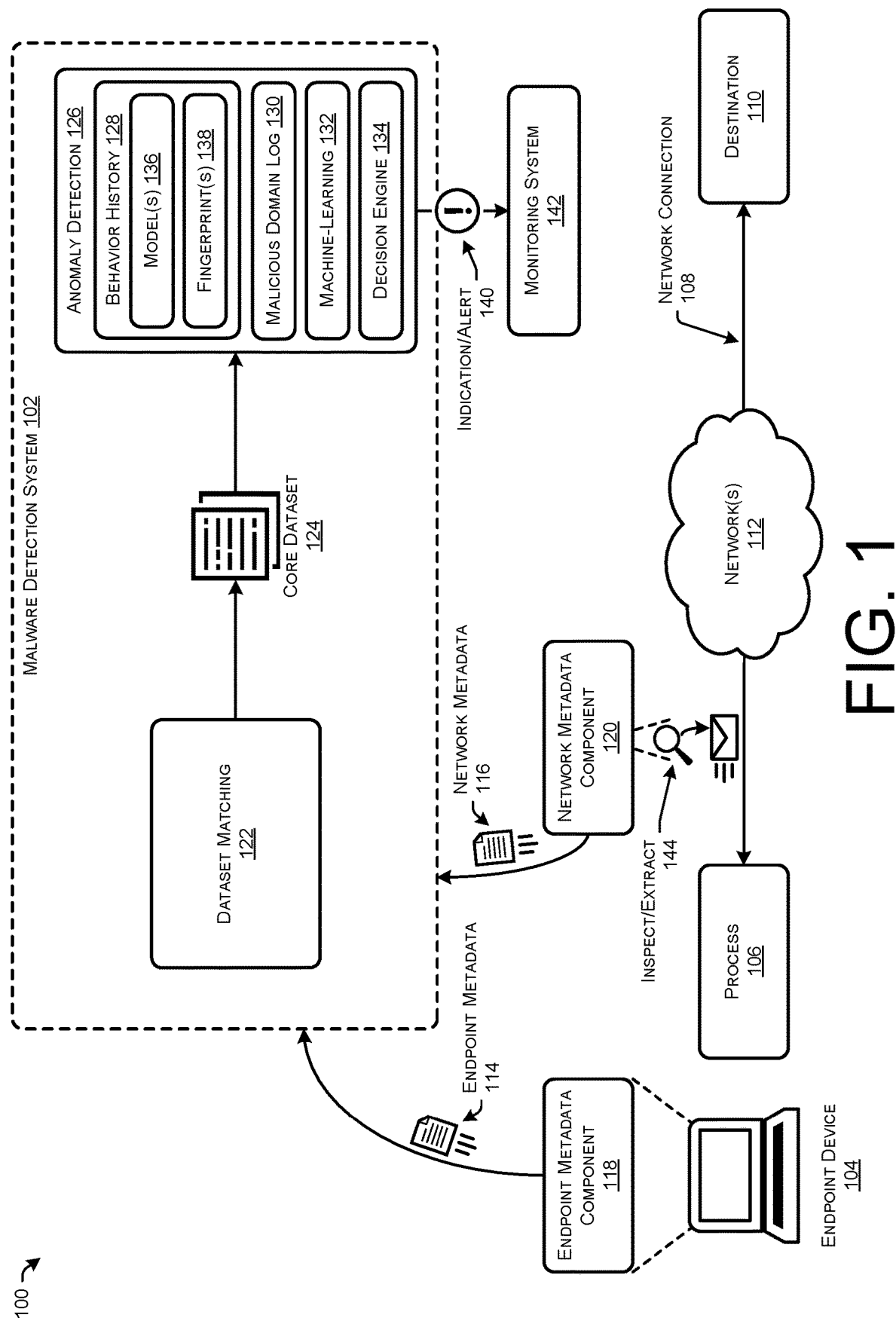
FIG. 1 illustrates an example architecture that may be utilized to perform various aspects of the techniques disclosed herein, including the illustrated example workflow.

This disclosure describes various technologies for detecting malware process injection on a host device, including the detection of process injection in an Extended Detection and Response (XDR) setting. By way of example, and not limitation, the techniques described herein may include receiving endpoint metadata associated with an event. In some examples, the endpoint metadata may include information associated with a process that made a network connection. In some examples, this process may be running on a host device of an enterprise network. The techniques may also include receiving network metadata associated with the event. In some examples, the network metadata may include a network protocol fingerprint used to make the network connection. The techniques may also include fusing, as a core dataset, the endpoint metadata and the network metadata. Based at least in part on the core dataset, the techniques may include determining that the network protocol fingerprint is indicative of a presence of malware process injection via the process running on the host device. The techniques may further include sending, to a monitoring system, an indication of the presence of the malware process injection within the process running on the host device.

Additionally, the techniques described herein may be performed as a method and/or by a system having non-transitory computer-readable media storing computer-executable instructions that, when executed by one or more processors, performs the techniques described above and herein.

EXAMPLE EMBODIMENTS

As discussed above, malware process injection is a sophisticated technique employed by malicious software to compromise the integrity and security of a computer system. This method involves the injection of malicious code or payloads into the address space of a legitimate process, allowing the malware to execute within the context of a trusted application. The process injection technique enables malware to evade detection and bypass security measures, as it operates within the guise of a legitimate process, making it more challenging for traditional antivirus and security tools to identify and mitigate the threat.

In an Extended Detection and Response (XDR) setting, detection engines have access to multiple views of an endpoint's activity and are capable of correlating a process that initiated a network connection with metadata associated with that network connection. However, similar to the impact of dataset poisoning, the impact of process injection on endpoint ground truth labels can mislead machine-learned models and other AI-based solutions, making the detection of process injection exceedingly difficult for XDR systems.

This application is directed to technologies for detecting malware process injection on a host device. In examples, multiple views of events (e.g., endpoint process information, host metadata, network traffic metadata, etc.) may be fused together, and prevalence information may be collected for all network activity related to a given process running on a host device. This fused data, which may be referred to herein as a core dataset, may then be used to determine whether process injection has taken place by using anomaly detection to identify a process's abnormal network activity, such as suddenly using a new network fingerprint, visiting unusual Internet destinations, using uncharacteristic metadata features like a new User-Agent, and the like. In the case that a presence of malware is determined as being likely, additional operations may be performed such as notifying a monitoring system, notifying interested parties (e.g., enterprise IT, administrators, etc.), performing remedial measures to mitigate (e.g., shutting down the compromised device, shutting down the compromised process on the device, etc.), generating a report associated with the detection (e.g., a report stating which process(es) appear to be problematic, which device(s) are at issue, which user(s) are at issue, timelines associated with the process injection, etc.), and/or the like.

In some examples, the core dataset may comprise two commonly collected sources of telemetry, those being host data and network data. However, other sources of telemetry may be used in addition, or in the alternative, to these. In some examples, this telemetry may come from different sources. For instance, the host metadata (also referred to herein as endpoint metadata) may be supplied from an agent running on the host device, such as the Network Visibility Module (NVM) produced by Cisco Systems, which is configured to collect rich flow context from an endpoint on or off premise and provide visibility into network connected devices and user behaviors. In examples, the host metadata may include, but not be limited to, metadata offering visibility regarding a device (e.g., the endpoint, irrespective of its location), a user (e.g., the person logged into the endpoint), an application (e.g., the application that generates the traffic), a location (e.g., the network location the traffic was generated on), and the destination (e.g., the actual FQDN to which this traffic was intended), process, process hash, parent process, and/or a network 5-tuple.

In examples, the network data may include information that gives a detailed view of the network including a network fingerprint, network metadata such as HTTP headers or TLS extensions, and the network 5-tuple. In general, network protocol fingerprinting is a form of pattern recognition that aims to identify a particular implementation of a protocol from the messages that it sends. In examples, a fingerprint (also referred to herein as a "network fingerprint" or even a "network protocol fingerprint") is a set of data features formed by selecting and normalizing some elements of a protocol message, which can be serialized into a string. In general, a single fingerprint may match more than one application, and a single application can also produce more than one fingerprint. In various examples, fingerprints can be generated differently based on the underlying protocol of a message. In this way, some fingerprints can be indicative of the protocol used for the message (e.g., HTTP, QUIC, TLS, TCP/IP, etc.). In examples, a fingerprint may be constructed out of a network session in a way that is characteristic of (e.g., identifies) the sender of the session. In various examples, a network protocol fingerprint may be an alphanumeric string that is at least partially indicative of a correlation between data observed on the enterprise network and software libraries used by the process to create the network connection.

In some examples, these network and endpoint datasets may be fused by the network 5-tuple and timestamp. For instance, because the network metadata and the endpoint metadata may both include the network 5-tuple, examining the network 5-tuple and timestamp for a selection of metadata allows the two disparate types of metadata to be fused together or otherwise associated with the same event. As will be explained in further detail below, the fusing of these datasets allows for determining a host, user, process, destination, fingerprint, and the like associated with a network connection. Without this fusion of data, it would not be possible to tie all this information together so that malware process injection could be detected, especially in enterprise settings where multiple host devices may be running the same processes, increasing the difficulty of tracing abnormal behavior to a specific endpoint.

To detect whether process injection has taken place, in some examples a behavior/history model may be generated for each process. In examples, these models may, for a given process, illustrate how the process behaved over a period of time (e.g., past 10 days, past 30 days, past year, etc.). Among other things, the data features in a particular model may include destination IP addresses that a process has visited/ used over the period of time, as well as any destination ports, network fingerprints used by the process, and protocol metadata such as the HTTP Host, HTTP User-Agent, and TLS server name. In some instances, the data features may be modified to generalize the features for more accurate and/or meaningful observations. For instance, a destination IP address may be converted to a/24 or subdomains may be removed from the HTTP Host.

In some examples, it may be possible to expand the set of features used for detecting process injection by adding population prevalence metrics. For instance, a population prevalence metric may indicate how many unique hosts visited a certain domain or address, regardless of which process was used to access the site. The most extreme case of a low prevalence event is referred to herein as a "singleton," where only a single host visits a domain or IP address in the relevant time period. Example low-prevalence features involve domains, IP subnets, and top-level domains.

By way of example, and not limitation, a method according to the techniques disclosed herein may include receiving endpoint metadata associated with an event. In examples, the event may include a network connection made by a process that is running on a host device. In some examples, the event may occur within an enterprise network. That is, the event may be a network connection made by a host device of an enterprise network (e.g., an enterprise managed device, an unmanaged device used by a user associated with the enterprise, an unmanaged device the enterprise network provides network connectivity to, etc.). In some examples, the endpoint metadata may include information associated with a process that made a network connection. Accordingly, the endpoint metadata may include, but not be limited to, a device identifier (e.g., the endpoint, irrespective of its location), a user identifier (e.g., the person logged into the endpoint), an application or process identifier (e.g., the application that generates the traffic), a location (e.g., the network location the traffic was generated on), a destination (e.g., the actual FQDN to which this traffic was intended), a process or application hash, a parent process, a network 5-tuple, and/or a timestamp associated with the event (e.g., a timestamp indicating a time when the network connection was made, a time when traffic (e.g., packets, messages, etc.) was sent or received, etc.). In some examples, the endpoint metadata may be received from an agent executing on the host device, a module that is monitoring one or more host devices but not executing on the host device, or the like.

In some examples, the method may include receiving network metadata associated with the event. In examples, the network metadata may be received from a network traffic monitoring component or agent that monitors traffic in the enterprise network, traffic originating from enterprise devices, traffic originating from unmanaged devices accessing or at least partially utilizing enterprise resources, or the like. For instance, the network metadata may be collected by, and received from, an opensource data collection tool. As another example, the network metadata may be used or collected by a firewall device or product, or from a network security monitoring solution (e.g., Cloud Analytics solution). In some examples, the network metadata may include, but not be limited to, a network protocol fingerprint used to make the network connection, HTTP headers, TLS extensions, a hostname associated with a network destination the process made or attempted to make the network connection with, a network 5-tuple, a timestamp, and/or any other information that gives a detailed view of the network.

In some examples, the method may include fusing, as part of a core dataset, the endpoint metadata and the network metadata. For instance, because the endpoint metadata and the network metadata may include at least partially overlapping features/elements, such as the network 5-tuple (source IP, destination IP, source port, destination port, protocol), timestamps, and potentially others, the endpoint metadata and the network metadata can be fused or otherwise associated with a same event, network connection, etc. In examples, fusing the endpoint metadata and the network metadata may be based on the network 5-tuple, the timestamp, and/or any other overlapping data. For instance, the method may include determining that a network 5-tuple included with the endpoint metadata is a same network 5-tuple included with the network metadata, that a timestamp included with the endpoint metadata is a same timestamp included with the network metadata, etc. By fusing this data as part of the core dataset, this offers more insight into the network activity of a process/application, which in turn promotes detecting whether any activity is abnormal. For instance, by fusing together endpoint metadata and network metadata, it is possible for detection systems to identify a specific host, server, etc. that a specific process made a network connection with. Further, the fused metadata allows for tying together specific processes with specific endpoint devices, users, etc. (e.g., for determining that "application A" running on "John Doe's device" made a network connection to "malicious domain B").

The method may also include, in some examples, generating, based at least in part on the core dataset, a model that is indicative of a behavior of the process over a period of time. In examples, this model may indicate which domains a process has made network connections with, network protocol fingerprints the process has used to make said network connections, a frequency in which connections are made with said domains, including domains that are both malicious and non-malicious, etc. In examples, the method may also include determining, using the core dataset and/or the model, that the process is engaging, or has engaged, in abnormal network activity. In examples, it may be determined that the abnormal network activity is due to the presence the malware process injection in the process on the host device. For instance, determining the abnormal network activity/presence of process injection may be based on the network protocol fingerprint, destinations visited by the process (e.g., singleton destinations), etc.

In some examples, based on detecting the presence of the malware process injection, the method may include sending an indication of the presence of the malware process injection within the process running on the host device. In some examples, this indication may be sent to a monitoring system of the enterprise network, an IT or network administrator associated with the enterprise network, a user of the host device with the compromised process/device, or the like. Additionally, in some examples, one or more remedial measures may be taken based on the process injection being detected. For instance, the compromised device may be shut down for further investigation, the process itself that is engaging in the abnormal activity may be shut down or removed from the device, the network may be restricted from providing network access to the device/process, or other remedial measures may be taken to prevent the spread of malware or the collection of sensitive information from the enterprise by the malware.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example architecture 100 that may be utilized to perform various aspects of the techniques disclosed herein, including the illustrated example workflow. The architecture 100 includes a malware detection system 102 that is configured to detect the presence of malware process injection on an endpoint device 104. In examples, the malware detection system 102 may be part of, or otherwise associated with, an XDR platform. That is, as XDR is generally considered a cybersecurity technology and strategy that combines and enhances the capabilities of traditional security tools such as Endpoint Detection and Response (EDR), Network Traffic Analysis (NTA), and Security Information and Event Management (SIEM) to provide a more comprehensive and integrated approach to threat detection, response, and investigation across various IT environments, the malware detection system 102 described herein, as well as its various components, modules, etc., may be an additional security tool in addition to the EDR, NTA, and SIEM tools noted above.

In examples, the malware detection system 102 may determine a presence of malware process injection on the endpoint device 104 based on network behavior of a process 106 running on the endpoint device 104. For example, when the process 106 running on the endpoint device 104 makes a network connection 108 with a destination 110 over one or more network(s) 112, the malware detection system 102 may obtain or otherwise receive endpoint metadata 114 and network metadata 116 associated with the network connection 108 and/or any traffic being sent over the network connection 108. In some examples, the endpoint metadata may be received from an endpoint metadata component 118 associated with the endpoint device. Similarly, in some examples, the network metadata 116 may be received from a network metadata component 120 that inspects/extracts 144 traffic, messages, etc. of the network connection 108.

In some examples, the endpoint metadata 114 may include, but not be limited to, a device identifier (e.g., the endpoint, irrespective of its location) associated with the endpoint device 104, a user identifier (e.g., the person logged into the endpoint), a process identifier associated with the process 106 (e.g., the application that generates the traffic), a location (e.g., the network location the traffic was generated on), the destination 110 (e.g., the actual FQDN to which this traffic was intended), a process or application hash, a parent process of the process 106, a network 5-tuple, and/or a timestamp associated with the event (e.g., a timestamp indicating a time when the network connection 108 was made, a time when traffic (e.g., packets, messages, etc.) was sent or received, etc.).

In some examples, the network metadata 116 may include, but not be limited to, a network protocol fingerprint used to make the network connection 108, HTTP headers, TLS extensions, a hostname associated with the destination 110, a network 5-tuple, a timestamp, and/or any other information that gives a detailed view of the network and or network connection 108. In examples, the network metadata component 120 may be a packet monitoring tool that is configured to, among other things, fingerprint network traffic and capture and analyze packet metadata. For instance, the network metadata component 120 may read network packets, identify metadata of interest, and write out the metadata in JSON or another format. Additionally, or alternatively, the network metadata component 120 may write out the packets that contain the metadata in the PCAP file format. In various examples, the network metadata component 120 may generate fingerprint strings for TLS, DTLS, SSH, HTTP, TCP, and other protocols. In some instances, these fingerprints may be formed by carefully selecting and normalizing metadata extracted from packets. In some examples, the network metadata component 120 may further be configured to identify processes based on fingerprints and/or destination context.

The malware detection system 102 may include a dataset matching component 122. The dataset matching component 122 may be configured to fuse or otherwise associate the endpoint metadata 114 and the network metadata 116 for a same event (e.g., the network connection 108 made by the process 106, messages or packets sent by the process 106 and/or the endpoint device 104, etc. For instance, because the endpoint metadata 114 and the network metadata 116 may include at least partially overlapping features/elements, such as the network 5-tuple (source IP, destination IP, source port, destination port, protocol), timestamps, and potentially others, the endpoint metadata 114 and the network metadata 116 can be fused by the dataset matching component 122. For instance, the dataset matching component 122 may be configured to determine that a network 5-tuple included with the endpoint metadata 114 is a same network 5-tuple included with the network metadata 116, that a timestamp included with the endpoint metadata 114 is a same timestamp included with the network metadata 116, etc. The dataset matching component 122 may output the core dataset 124, or a part thereof, based on fusing the endpoint metadata 114 and the network metadata 116.

The core dataset 124 may then be input to an anomaly detection component 126. As shown in FIG. 1, the anomaly detection component 126 may include various functionality and component for performing different processes. For instance, the anomaly detection component 126 may include a behavior history component 128, a malicious domain log 130, a machine-learning component 132, and a decision engine 134.

The behavior history component 128 may generate and/or store one or more model(s) 136 for various processes, such as the process 106. These model(s) 136 may be indicative of a process's behavior over a period of time (e.g., past week, past month, etc.). In some examples, the model(s) 136 may indicate which destinations that the process 106 has visited over the period of time, which protocols the process 106 has utilized, frequencies in which those destinations have been visited, and the like. Additionally, the behavior history component 128 may store one or more network fingerprint(s) 138 that a process 106 has used for making network connections.

The malicious domain log 130 may store identities of one or more malicious domains. That is, the malicious domain log 130 may store data indicating various IP addresses, URLs, hostnames, addresses, etc. associated with known, malicious domains. In examples, the malicious domain log 130 may be visited or otherwise checked when examining the core data set 124 to determine whether a domain visited by a process is included in the malicious domain log 130.

The machine-learning component 132 may include functionality to generate, train, and run one or more machine-learned models that can be utilized by the anomaly detection component 126 for determining whether a process's behavior is anomalous. For instance, a model of the model(s) 136 associated with a process may be input into the machine-learning component 132 and/or one or more machine-learned models, and based on the input model an output may be received from the machine-learning component 132 that indicates whether the process has engaged in anomalous and, potentially, malicious network activity.

The decision engine 134 may be configured to make decisions regarding whether a process's behavior is anomalous. In examples, the decision engine may act as a final decision as to whether an indication/alert 140 should be issued, thereby indicating that a process may be compromised. In examples, the decision engine 134 may examine all the data it has available, including outputs from the machine-learning component 132, the malicious domain log 130, and the behavior history data (e.g., model(s) 136 and fingerprint(s) 138) to make a decision as to whether a process's behavior is indicative of malware process injection.

In some examples, based on detecting the presence of the malware process injection, the anomaly detection component 126 and/or the malware detection system 102 may output the indication/alert 140 to a monitoring system 142. In examples, the monitoring system 142 may be associated with an enterprise network. In examples the monitoring system 142 may be capable of invoking one or more remedial measures based on the process injection being detected. For instance, the monitoring system 142 may be capable of shutting down a compromised device for further investigation, shutting down the process itself that is engaging in the abnormal activity, removing the compromised process from the device, restricting the network(s) 112 from providing network access to the device/process, or other taking other remedial measures to prevent the spread of malware or the collection of sensitive information from the enterprise by the malware.

Figure 2:
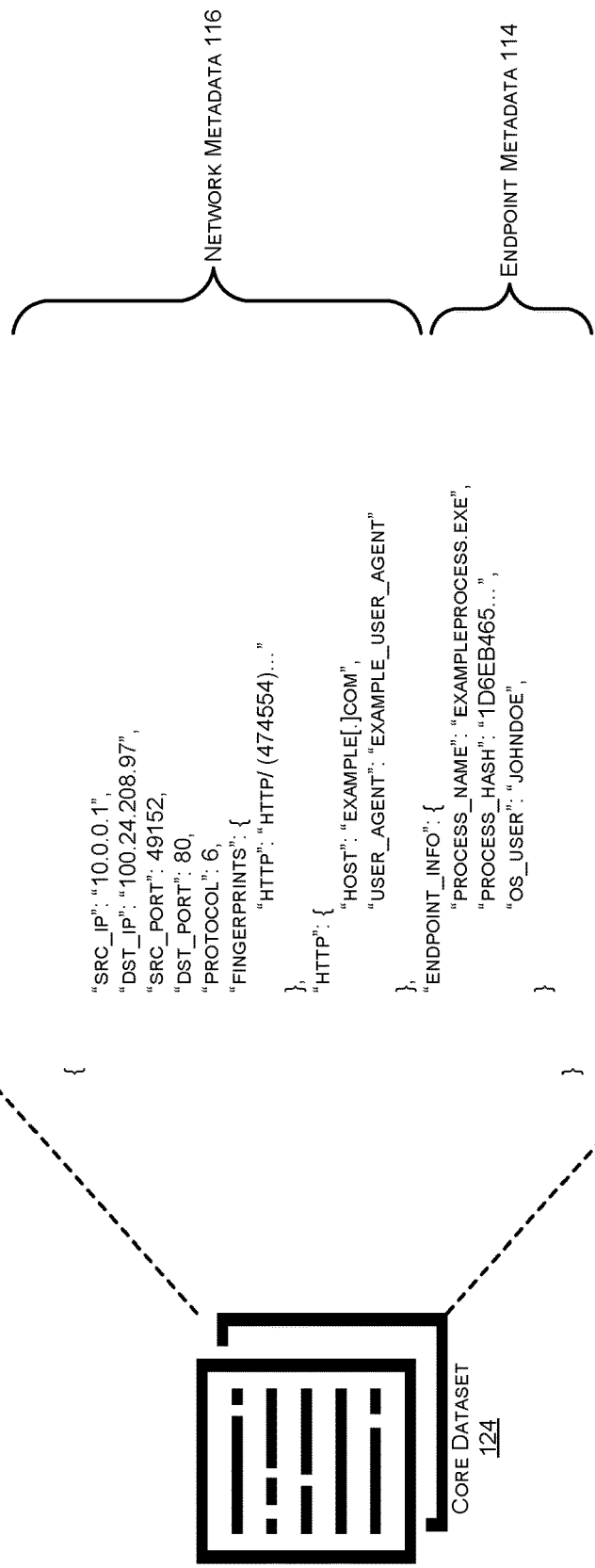
FIG. 2 illustrates example detail that may be included in a core dataset in accordance with the techniques disclosed herein.

FIG. 2 illustrates example detail 200 that may be included in the core dataset 124 in accordance with the techniques disclosed herein. For instance, the core dataset 124 may include the endpoint metadata 114 and the network metadata 116. Although shown as part of the network metadata 116 in FIG. 2, the network 5-tuple (SRC_IP, DST_IP, SRC_PORT, DST_PORT, and PROTOCOL) may be included in both the network metadata 116 and/or the endpoint metadata 114. Additionally, although not illustrated in FIG. 2, the core dataset 124 may also include one or more timestamp(s).

Figure 3:
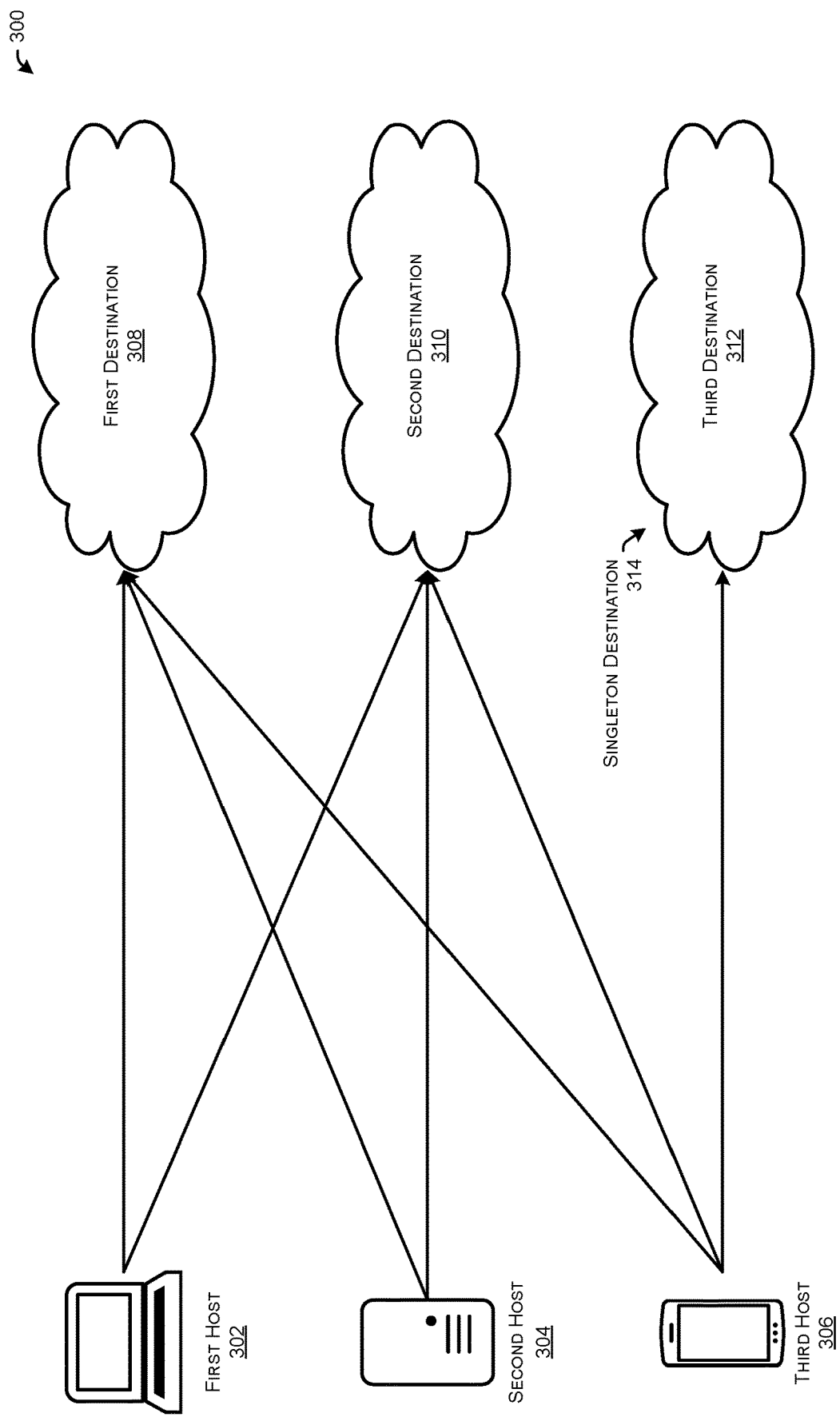
FIG. 3 is an example illustration of a singleton destination which, according to the techniques disclosed herein, can be indicative of abnormal behavior and/or process injection.

FIG. 3 is an example illustration 300 of a singleton destination 314 which, according to the techniques disclosed herein, can be indicative of abnormal behavior and/or process injection. In various examples, the illustration 300 may be depicted or otherwise indicated in one of the model(s) 136 described in FIG. 1. For instance, it may be determined that a process running on the the first host 302 has visited the first destination 308 and the second destination 310, that the same process running on the second host 304 has also visited the first destination 308 and the second destination 310, but that the same process running on the third host 306 has visited the third destination 312 in addition to visiting the first destination 308 and the second destination 310. As such, the third destination 312 may be labeled as a singleton destination 314 since only one host/process has visited it. This may be indicative of process injection, in some instances.

Figure 4:
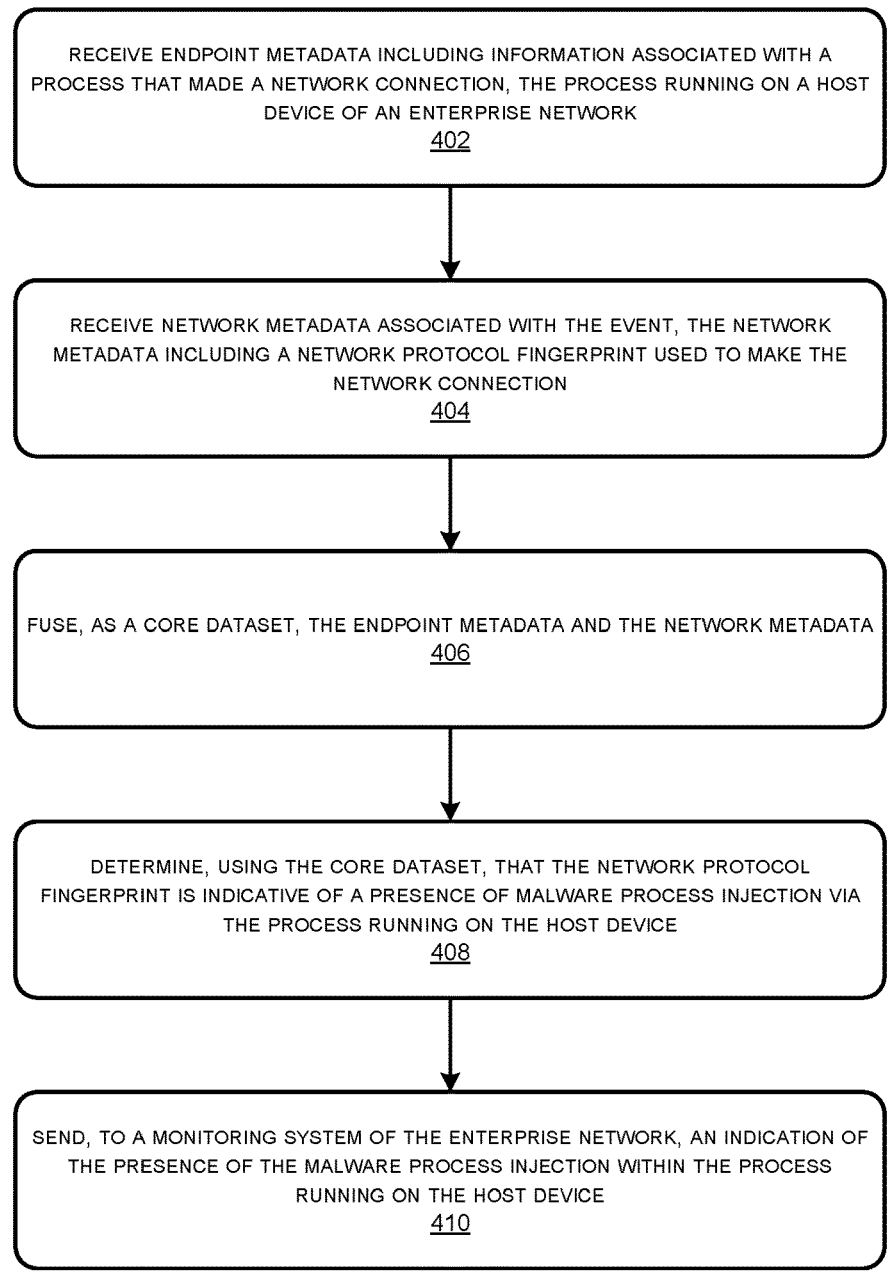
FIG. 4 is a flow diagram illustrating an example method associated with the techniques disclosed herein.
Figure 5:
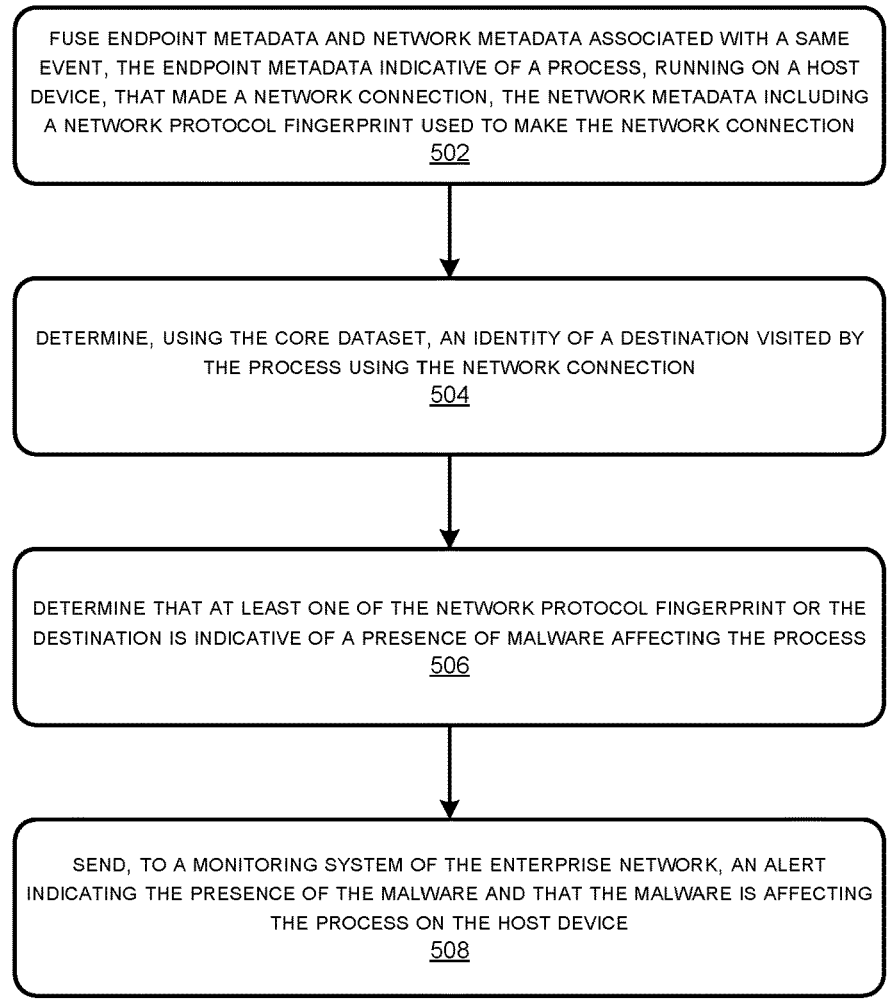
FIG. 5 is a flow diagram illustrating another example method associated with the techniques disclosed herein.

FIGS. 4 and 5 are flow diagrams illustrating example methods 400 and 500 associated with the techniques described herein. The logical operations described herein with respect to FIGS. 4 and 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIGS. 4 and 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 4 is a flow diagram illustrating an example method 400 associated with the techniques disclosed herein. The method 400 begins at operation 402, which includes receiving endpoint metadata including information associated with a process that made a network connection, the process running on a host device of an enterprise network. For instance, the dataset matching component 122 of the malware detection system 102 may receive the endpoint metadata 114. In examples, the endpoint metadata may include information associated with the process 106 that made the network connection 108. The process 106 may be running on a host device (e.g., endpoint device 104) of an enterprise network. In examples, the endpoint metadata 114 may include, but not be limited to, an identifier (e.g., name) associated with the process 106, a hash associated with the process 106, a network 5-tuple, and/or a user associated with the host device. In some examples, the endpoint metadata may include application layer (e.g., L7) information.

At operation 404, the method 400 includes receiving network metadata associated with the event, the network metadata including a network protocol fingerprint used to make the network connection. For instance, the dataset matching component 122 of the malware detection system 102 may receive the network metadata 116. In examples, the network metadata may include information associated with the network connection or network traffic. Among other things, the network metadata 116 may include the network 5-tuple, one or more network protocol fingerprints, an identifier associated with a destination, a user agent, and/or the like. In examples, the network metadata may include network layer or network level information (e.g., L3, L4, and/or L5 information).

At operation 406, the method 400 includes fusing (e.g., merging, combining, associating, grouping, etc.), as a core dataset, the endpoint metadata and the network metadata. For instance, the dataset matching component 122 may fuse the endpoint metadata 114 and the network metadata 116 to generate the core dataset 124. In various examples, the core dataset 124 may include multiple instances of fused metadata for multiple events, network connections, processes, and the like. In this way, the malware detection system 102 may monitor multiple different processes and multiple different endpoint devices at a time.

At operation 408, the method 400 includes determining, using the core dataset, that the network protocol fingerprint is indicative of a presence of malware process injection via the process running on the host device. For instance, the anomaly detection component 126 of the malware detection system 102 may determine, using the core dataset 124, that the network protocol fingerprint is indicative of a presence of process injection, and/or that the process 106 on the endpoint device 104 is compromised. In examples, the anomaly detection component 126 may generate a model representing how the process 106, as well as other processes, behaved over a previous period of time. The model(s) may be generated using the core dataset 124 and/or other fused metadata. The anomaly detection component 126 may then analyze the model to determine whether process injection is present.

At operation 410, the method 400 includes sending, to a monitoring system of the enterprise network, an indication of the presence of the malware process injection within the process running on the host device. For instance, the anomaly detection component 126 may send the indication/alert 140 to the monitoring system 142. Additionally, or alternatively, the malware detection system 102, the monitoring system 142, and/or the anomaly detection component 126 may cause an action to be performed based on detecting the presence of the malware. This action could include shutting down the endpoint device 104, shutting down the process 106 on the endpoint device, restricting resource access for the endpoint device 104 and/or the process 106, and/or the like.

FIG. 5 is a flow diagram illustrating another example method 500 associated with the techniques disclosed herein. The method 500 begins at operation 502, which includes fusing (e.g., merging, combining, associating, grouping, etc.) endpoint metadata and network metadata associated with a same event, the endpoint metadata indicative of a process, running on a host device, that made a network connection, the network metadata including a network protocol fingerprint used to make the network connection. For instance, the dataset matching component 122 may fuse the endpoint metadata 114 and the network metadata 116 to generate the core dataset 124. In examples, the dataset matching component 122 may fuse the endpoint metadata 114 and the network metadata 116 based at least in part on a network 5-tuple included with both the endpoint metadata 114 and the network metadata 116, based on timestamps included with both the endpoint metadata 114 and the network metadata 116, a combination thereof, and/or other information included in the metadata. In various examples, the core dataset 124 may include multiple instances of fused metadata for multiple events, network connections, processes, and the like. In this way, the malware detection system 102 may monitor multiple different processes and multiple different endpoint devices at a time.

At operation 504, the method 500 includes determining, using the core dataset, an identity of a destination visited by the process using the network connection. For instance, the anomaly detection component 126 may determine the identity of the destination 110 visited by the process 106 using the network connection 108. In examples, the anomaly detection component 126 may determine the identity of the destination 110 based at least in part on analyzing the core dataset 124, which includes the endpoint metadata 114 and the network metadata 116 and is indicative of the identity and other information associated with the destination 110.

At operation 506, the method 500 includes determining that at least one of the network protocol fingerprint or the destination is indicative of a presence of malware affecting the process. For instance, the anomaly detection component 126 of the malware detection system 102 may determine, using the core dataset 124, that the network protocol fingerprint or the visited destination is indicative of the presence of process injection, and/or that the process 106 on the endpoint device 104 is compromised. In examples, the anomaly detection component 126 may generate a model representing how the process 106, as well as other processes, behaved over a previous period of time. The model(s) may be generated using the core dataset 124 and/or other fused metadata. The anomaly detection component 126 may then analyze the model to determine whether process injection is present.

At operation 508, the method 500 includes sending, to a monitoring system of the enterprise network, an alert indicating the presence of the malware and that the malware is affecting the process on the host device. For instance, the anomaly detection component 126 may send the indication/alert 140 to the monitoring system 142. Additionally, or alternatively, the malware detection system 102, the monitoring system 142, and/or the anomaly detection component 126 may cause an action to be performed based on detecting the presence of the malware. This action could include shutting down the endpoint device 104, shutting down the process 106 on the endpoint device, restricting resource access for the endpoint device 104 and/or the process 106, and/or the like.

Figure 6:
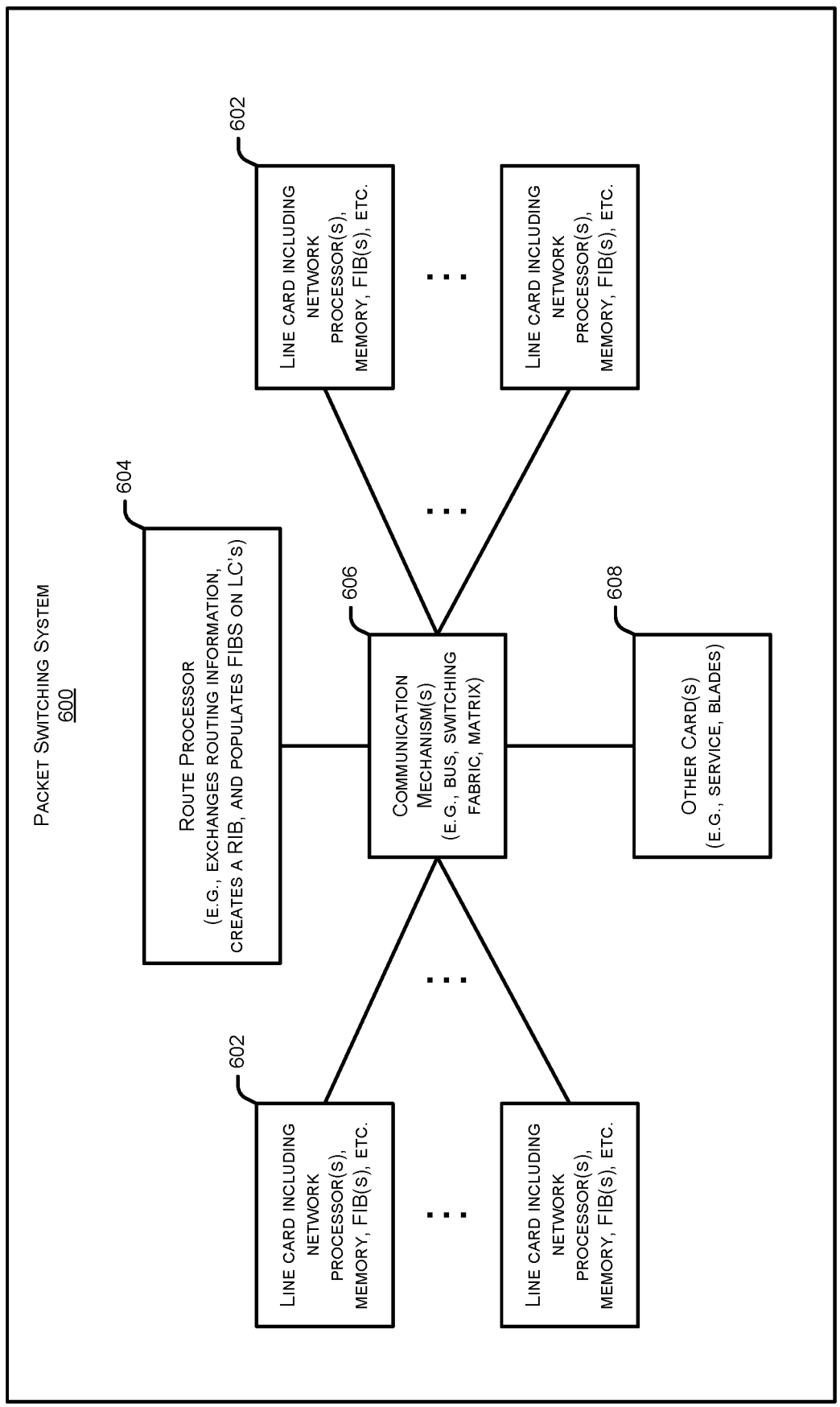
FIG. 6 is a block diagram illustrating an example packet switching system that can be utilized to implement various aspects of the technologies disclosed herein.

FIG. 6 is a block diagram illustrating an example packet switching system 600 (or packet switching device) that can be utilized to implement various aspects of the technologies disclosed herein. In some examples, the packet switching system 600 may be employed in various networks and architectures, such as those described herein.

In some examples, the packet switching system 600 may comprise multiple line card(s) 602, each with one or more network interfaces for sending and receiving packets over communications links (e.g., possibly part of a link aggregation group). The packet switching system 600 may also have a control plane with one or more route processor 604 elements for managing the control plane and/or control plane processing of packets associated with forwarding of packets in a network, including, but not limited to, exchanging routing information, creating routing information base(s) (RIBs), and/or populating forward information base(s) (FIBs) on LCs. The packet switching system 600 may also include other cards 608 (e.g., service cards, blades) which include processing elements that are used to process (e.g., forward/send, drop, manipulate, change, modify, receive, create, duplicate, apply a service) packets associated with forwarding of packets in a network. The packet switching system 600 may comprise hardware-based communication mechanism 606 (e.g., bus, switching fabric, and/or matrix, etc.) for allowing its different entities to communicate. Line card(s) 602 may typically perform the actions of being both an ingress and/or an egress line card 602 in regard to multiple other particular packets and/or packet streams being received by, or sent from, packet switching system 600.

Figure 7:
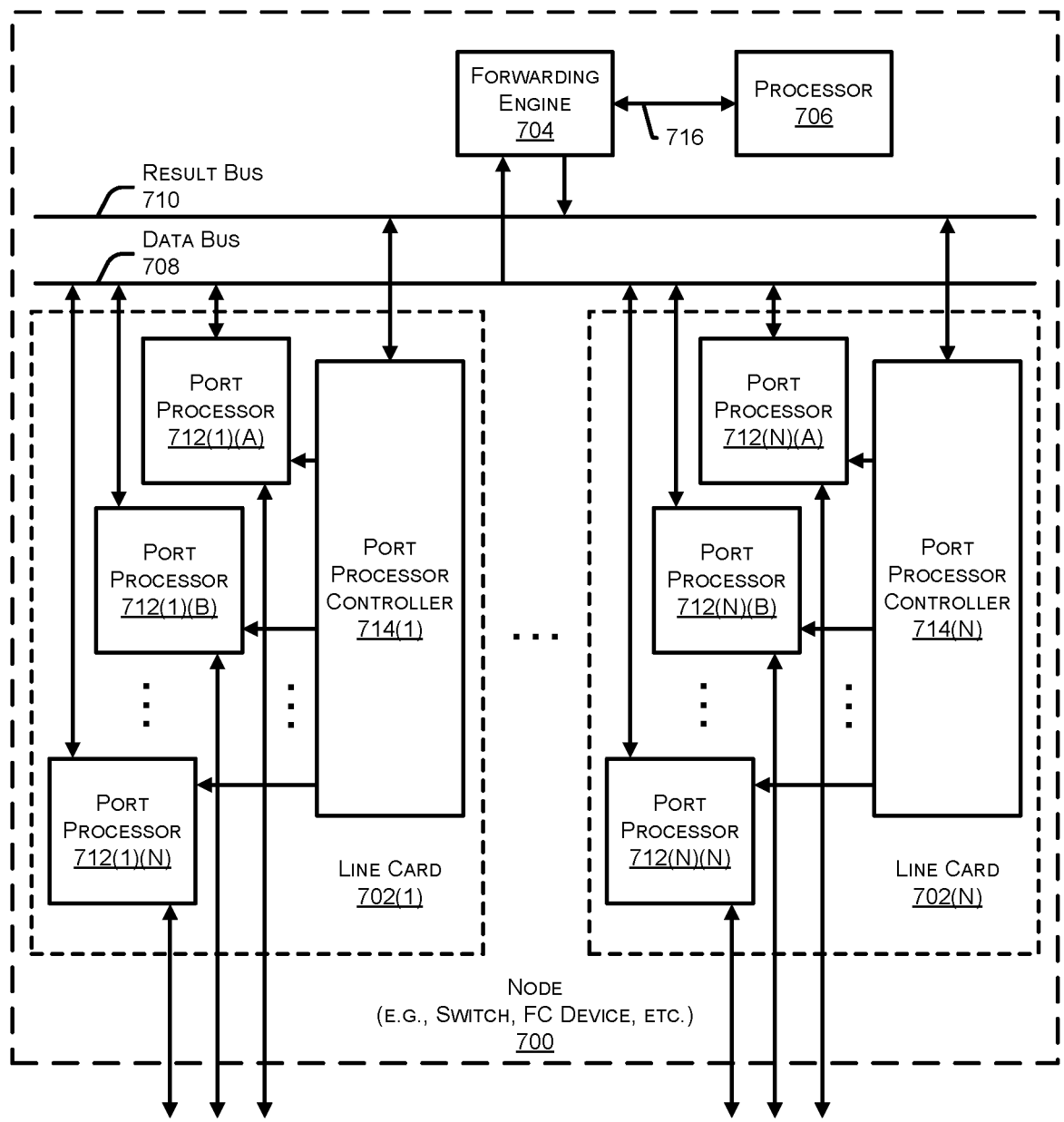
FIG. 7 is a block diagram illustrating certain components of an example node that can be utilized to implement various aspects of the technologies disclosed herein.

FIG. 7 is a block diagram illustrating certain components of an example node 700 that can be utilized to implement various aspects of the technologies disclosed herein. In some examples, node(s) 700 may be employed in various architectures and networks.

In some examples, the node 700 may include any number of line cards 702 (e.g., line cards 702(1)-(N), where N may be any integer greater than 1) that are communicatively coupled to a forwarding engine 704 (also referred to as a packet forwarder) and/or a processor 706 via a data bus 708 and/or a result bus 710. Line cards 702(1)-(N) may include any number of port processors 712(1)(A)-(N)(N) which are controlled by port processor controllers 714(1)-(N), where N may be any integer greater than 1. Additionally, or alternatively, forwarding engine 704 and/or processor 706 are not only coupled to one another via the data bus 708 and the result bus 710, but may also communicatively coupled to one another by a communications link 716.

The processors (e.g., the port processor(s) 712 and/or the port processor controller(s) 714) of each line card 702 may be mounted on a single printed circuit board. When a packet or packet and header are received, the packet or packet and header may be identified and analyzed by node 700 (also referred to herein as a router) in the following manner. Upon receipt, a packet (or some or all of its control information) or packet and header may be sent from one of port processor(s) 712(1)(A)-(N)(N) at which the packet or packet and header was received and to one or more of those devices coupled to the data bus 708 (e.g., others of the port processor(s) 712(1)(A)-(N)(N), the forwarding engine 704 and/or the processor 706). Handling of the packet or packet and header may be determined, for example, by the forwarding engine 704. For example, the forwarding engine 704 may determine that the packet or packet and header should be forwarded to one or more of port processors 712(1)(A)-(N)(N). This may be accomplished by indicating to corresponding one(s) of port processor controllers 714(1)-(N) that the copy of the packet or packet and header held in the given one(s) of port processor(s) 712(1)(A)-(N)(N) should be forwarded to the appropriate one of port processor(s) 712(1)(A)-(N)(N). Additionally, or alternatively, once a packet or packet and header has been identified for processing, the forwarding engine 704, the processor 706, and/or the like may be used to process the packet or packet and header in some manner and/or maty add packet security information in order to secure the packet. On a node 700 sourcing such a packet or packet and header, this processing may include, for example, encryption of some or all of the packet's and/or header's information, the addition of a digital signature, and/or some other information and/or processing capable of securing the packet or packet and header. On a node 700 receiving such a processed packet or packet and header, the corresponding process may be performed to recover or validate the packet's and/or header's information that has been secured.

Figure 8:
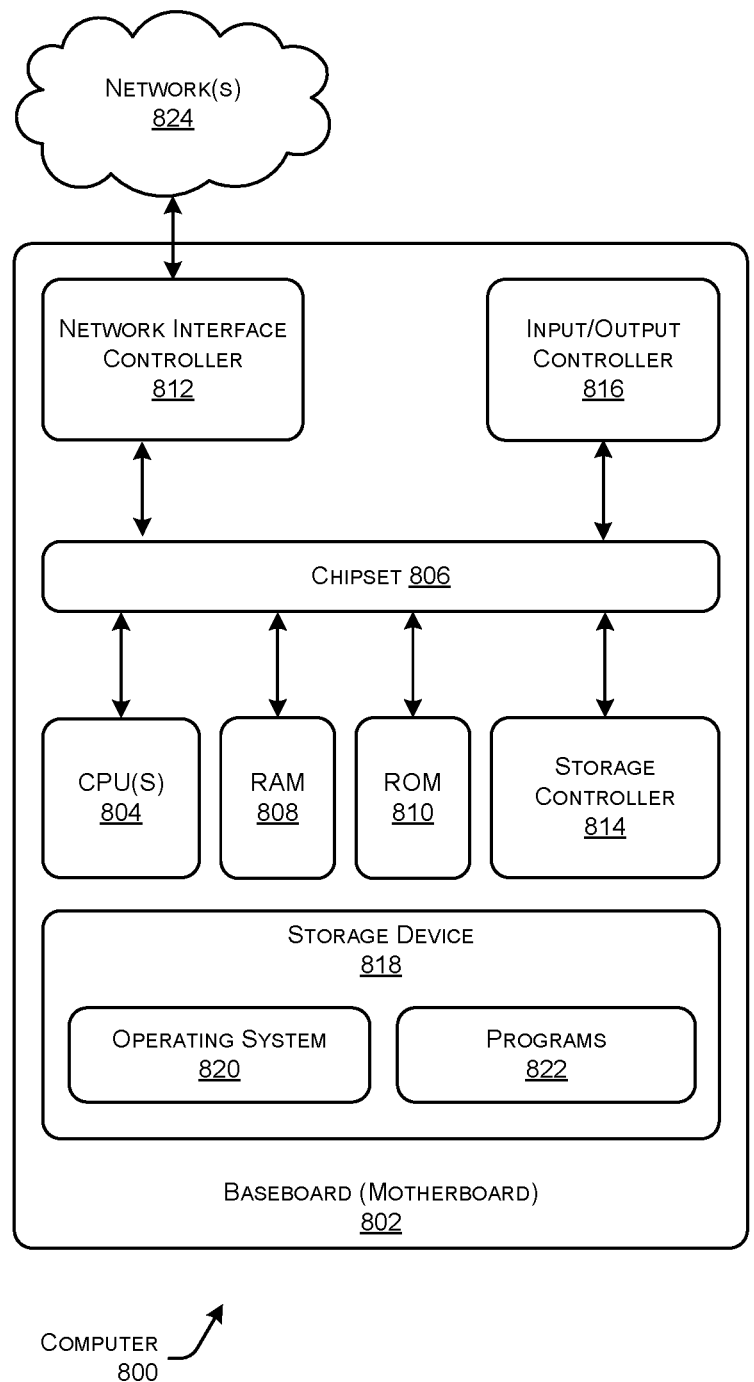
FIG. 8 is a computer architecture diagram showing an illustrative computer hardware architecture for implementing a computing device that can be utilized to implement aspects of the various technologies presented herein.

FIG. 8 is a computer architecture diagram showing an illustrative computer hardware architecture for implementing a computing device that can be utilized to implement aspects of the various technologies presented herein. The computer architecture shown in FIG. 8 may be illustrative of a conventional server computer, router, switch, node, workstation, desktop computer, laptop, tablet, network appliance, e-reader, smartphone, load balancer, endpoint device 104, or other computing device that may be capable of performing some or all of the features of the malware detection system 102, and can be utilized to execute any of the software components presented herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network. The chipset 806 can include functionality for providing network connectivity through a NIC 812, such as a gigabit Ethernet adapter. The NIC 812 is capable of connecting the computer 800 to other computing devices over the network 824, such as any of the entities/systems/devices described above with reference to FIGS. 1-7. It should be appreciated that multiple NICs 812 can be present in the computer 800, connecting the computer to other types of networks and remote computer systems. In some examples, the NIC 812 may be configured to perform at least some of the techniques described herein.

The computer 800 can be connected to a storage device 818 that provides non-volatile storage for the computer. The storage device 818 can store an operating system 820, programs 822, and data, which have been described in greater detail herein. The storage device 818 can be connected to the computer 800 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by the architecture illustrated in FIG. 1 and or any components included therein, may be supported by one or more devices similar to computer 800. Stated otherwise, some or all of the operations performed by the architecture illustrated in FIG. 1 and or any components included therein, may be performed by one or more computer devices, which may be similar to the computer 800, operating in a scalable arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the computer 800.

In one embodiment, the storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes and functionality described above with regard to FIGS. 1-7, and herein. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

The computer 800 may include one or more hardware processors (processors) configured to execute one or more stored instructions. The processor(s) may comprise one or more cores. Further, the computer 800 may include one or more network interfaces configured to provide communications between the computer 800 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 822 may comprise any type of programs or processes to perform the techniques described in this disclosure for detecting malware process injection on a host device by fusing disparate metadata and generating one or more models associated with the process to analyze whether the process's behavior over a period of time is indicative of process injection.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
receiving endpoint metadata associated with an event in an enterprise network, the endpoint metadata including information associated with a process that made a network connection, the process running on a host device of the enterprise network;
receiving network metadata associated with the event, the network metadata including a network protocol fingerprint used to make the network connection;
fusing, as a core dataset, the endpoint metadata and the network metadata;
determining, using the core dataset, that the network protocol fingerprint is indicative of a presence of malware process injection via the process running on the host device; and
sending, to a monitoring system of the enterprise network, an indication of the presence of the malware process injection within the process running on the host device.

2. The method of claim 1, wherein the network protocol fingerprint and additional information included in the core dataset is indicative of the process engaging in abnormal network activity based at least in part on the presence of the malware process injection.

3. The method of claim 1, wherein the information included in the endpoint metadata comprises an identifier of the process, a hash associated with the process, and a parent process of the process.

4. The method of claim 1, wherein the network metadata further includes a hostname and internet protocol (IP) address associated with a network destination the process made or attempted to make the network connection with.

5. The method of claim 1, wherein the network protocol fingerprint is an alphanumeric string that is at least partially indicative of a correlation between data observed on the enterprise network and software libraries used by the process to create the network connection.

6. The method of claim 1, further comprising determining that a network 5-tuple included with the endpoint metadata is a same network 5-tuple included with the network metadata, and wherein fusing, as the core dataset, the endpoint metadata and the network metadata is based at least in part on the endpoint metadata and the network metadata including the same network 5-tuple.

7. The method of claim 6, wherein fusing, as the core dataset, the endpoint metadata and the network metadata is further based at least in part on a timestamp associated with the endpoint metadata and the network metadata.

8. The method of claim 1, further comprising generating, based at least in part on the core dataset, a model that is indicative of a behavior of the process over a period of time, wherein determining that the network protocol fingerprint is indicative of the presence of the malware process injection is based at least in part on the model.

9. A system comprising:
one or more processors; and
one or more non-transitory computer-readable media storing instructions that, when executed, cause the one or more processors to perform operations comprising:
receiving endpoint metadata associated with an event in an enterprise network, the endpoint metadata including information associated with a process that made a network connection, the process running on a host device of the enterprise network;
receiving network metadata associated with the event, the network metadata including a network protocol fingerprint used to make the network connection;
fusing, as a core dataset, the endpoint metadata and the network metadata;

determining, using the core dataset, that the network protocol fingerprint is indicative of a presence of malware process injection via the process running on the host device; and sending, to a monitoring system of the enterprise network, an indication of the presence of the malware process injection within the process running on the host device.

10. The system of claim 9, wherein the network protocol fingerprint and additional information included in the core dataset is indicative of the process engaging in abnormal network activity based at least in part on the presence of the malware process injection.

11. The system of claim 9, wherein the information included in the endpoint metadata comprises an identifier of the process, a hash associated with the process, and a parent process of the process.

12. The system of claim 9, wherein the network metadata further includes a hostname and internet protocol (IP) address associated with a network destination the process made or attempted to make the network connection with.

13. The system of claim 9, wherein the network protocol fingerprint is an alphanumeric string that is at least partially indicative of a correlation between data observed on the enterprise network and software libraries used by the process to create the network connection.

14. The system of claim 9, the operations further comprising determining that a network 5-tuple included with the endpoint metadata is a same network 5-tuple included with the network metadata, and wherein fusing, as the core dataset, the endpoint metadata and the network metadata is based at least in part on the endpoint metadata and the network metadata including the same network 5-tuple.

15. The system of claim 14, wherein fusing, as the core dataset, the endpoint metadata and the network metadata is further based at least in part on a timestamp associated with the endpoint metadata and the network metadata.

16. The system of claim 9, the operations further comprising generating, based at least in part on the core dataset, a model that is indicative of a behavior of the process over a period of time, wherein determining that the network protocol fingerprint is indicative of the presence of the malware process injection is based at least in part on the model.

17. One or more non-transitory computer-readable media storing instructions that, when executed, cause one or more processors to perform operations comprising:

receiving endpoint metadata associated with an event in an enterprise network, the endpoint metadata including information associated with a process that made a network connection, the process running on a host device of the enterprise network;

receiving network metadata associated with the event, the network metadata including a network protocol fingerprint used to make the network connection;

fusing, as a core dataset, the endpoint metadata and the network metadata;

determining, using the core dataset, that the network protocol fingerprint is indicative of a presence of malware process injection via the process running on the host device; and sending, to a monitoring system of the enterprise network, an indication of the presence of the malware process injection within the process running on the host device.

18. The one or more non-transitory computer-readable media of claim 17, wherein the information included in the endpoint metadata comprises an identifier of the process, a hash associated with the process, and a parent process of the process.

19. The one or more non-transitory computer-readable media of claim 17, wherein the network metadata further includes a hostname and internet protocol (IP) address associated with a network destination the process made or attempted to make the network connection with.

20. The one or more non-transitory computer-readable media of claim 17, wherein the network protocol fingerprint is an alphanumeric string that is at least partially indicative of a correlation between data observed on the enterprise network and software libraries used by the process to create the network connection.

* * * * *